United States Patent [19]

Downing, Jr.

[11] 4,347,907
[45] * Sep. 7, 1982

[54] ALL-ELECTRIC A.C. TRACTOR

[76] Inventor: James H. Downing, Jr., Rte. 2, Box 276, Louisa, Va. 23093

[*] Notice: The portion of the term of this patent subsequent to Jun. 28, 1995, has been disclaimed.

[21] Appl. No.: 91,307

[22] Filed: Nov. 5, 1979

Related U.S. Application Data

[60] Division of Ser. No. 941,358, Sep. 11, 1978, Pat. No. 4,196,785, which is a continuation-in-part of Ser. No. 769,378, Feb. 16, 1977, Pat. No. 4,113,045.

[51] Int. Cl.³ .............................................. B60L 11/08
[52] U.S. Cl. ................... 180/65 C; 198/308
[58] Field of Search ............... 198/304, 313, 308, 316, 198/513, 518, 668, 314; 414/526, 502–505; 180/6.48, 6.5, 65 R, 65 C

[56] References Cited

U.S. PATENT DOCUMENTS 2,964,158  12/1960  Walls .................................. 198/308
4,093,087  6/1978  De Coene ........................... 414/526
4,113,045  9/1978  Downing ........................... 180/65 C Primary Examiner—Robert B. Reeves
Assistant Examiner—Gene A. Church
Attorney, Agent, or Firm—Sughrue, Mion, Zinn, Macpeak & Seas

[57] ABSTRACT

An electronic differential speed control circuit for driving the inboard and outboard A.C. wheel motors at different relative speeds depending upon the steering angle during a turn. An electrical circuit for sensing the torque of the tractor's wheel motors to maintain a constant implement draft. A hollow tubular axle pivots around the tractor's longitudinal material-transferring tunnel to conserve space and permit mounting of the wheel motors within the axle. The tunnel has two material-transferring compartments or passageways, and has vertically movable extensions on either end to facilitate coupling to accessories. An electrical power outlet is provided for energizing non-motor driven accessories.

1 Claim, 6 Drawing Figures

ALL-ELECTRIC A.C. TRACTOR

CROSS-REFERENCE TO RELATED APPLICATION

This application is a division of application Ser. No. 941,358, filed Sept. 11, 1978 now U.S. Pat. No. 4,196,785 which, in turn, is a continuation-in-part of application Ser. No. 769,378 filed Feb. 16, 1977, (now U.S. Pat. No. 4,113,045) the benefit of which is claimed as provided by 35 USC 120.

BACKGROUND OF THE INVENTION

1. Field of the Invention

This invention relates generally to the field of farm tractors having accessories driven by power supplied by the tractor and, more particularly, to an all-electric tractor having an A.C. power source which provides power both for energizing induction motors for driving the tractor's wheels and also for energizing electric accessories associated with the tractor.

2. Description of the Prior Art

The wheels or other traction means of farm tractors or other land vehicles have traditionally been driven by internal combustion engines through mechanical coupling means, including complex transmissions. Furthermore, accessories were mechanically driven by a power-take-off (PTO) driven by the engine. It is also broadly known to drive the wheels of a land vehicle by A.C. induction motors controlled by cycloconverters. In addition, there has recently been developed a log stacker whose wheels are driven by D.C. motors and whose log handling mechanism is driven by A.C. motors. Also, there has been disclosed the concept of driving the wheels of both a truck and its trailer by individual wheel motors powered by a generator located in the truck.

Examples of such prior art systems are found in the following U.S. patents and publications:

Patents

U.S. Pat. No. 3,577,050; Ringland et al; May 4, 1971
U.S. Pat. No. 3,584,276; Ringland et al; June 8, 1971
U.S. Pat. No. 3,690,395; Spiller et al; Sept. 12, 1972
U.S. Pat. No. 3,713,504; Shimer et al; Jan. 30, 1973
U.S. Pat. No. 3,860,081; Moll et al; Jan. 14, 1975

Publications

An A-C Individual Wheel Drive System for Land Vehicles, Document 660,134 (undated), by Walter Slabiak, U.S. Army Tank-Automotive Center, pp. 664–671

"Precise Control of a Three-Phase Squirrel-Cage Induction Motor Using a Practical Cycloconverter", Slabiak and Lawson, dated July/August, 19?, IEEE Transactions on Industry and General Applications, Volume 2, No. 4

"Optimal Control, System Performance for an A-C Electric Vehicular Drive", Lawson et al, Power Equipment Div., Lear Siegler, Inc., Document 660,135 (undated)

Le Tourneau Letro-Stacker Product Circular, dated September 1969

SUMMARY OF THE INVENTION

The primary object of this invention is to provide an all-electric A.C. tractor system wherein the tractor's wheels are driven by controllable A.C. induction motors and wherein other accessories are energized by power derived from an A.C. power supply carried by the tractor.

A more specific object of this invention is to provide such a tractor system wherein the A.C. power supplied to the wheel induction motors are controlled by a cycloconverter and also by an electronic differential speed control circuit which automatically drives the inboard and outboard wheels of the tractor at different relative speeds in accordance with the steering angle of the tractor.

Another object of the invention is to provide such a tractor with a longitudinal material-transferring tunnel having a vertically movable extension at one end thereof.

Another object of the invention is to provide such a tunnel with two separate compartments for transferring different materials at the same time.

Another object of the invention is to provide such a tractor with tubular axles in which the wheel drive motors are mounted, thereby saving space over prior art designs.

Still another object is to construct such a tubular axle so that it pivots about the material transferring tunnel.

Still another object of the invention is to provide such a tractor system with one or more A.C. and/or D.C. power outlets from which non-motor driven electric accessories can be energized.

Another object of the invention is to provide such a tractor system with a torque demand monitor circuit coupled to the circuit of a wheel driving motor to determine drive wheel torque and in turn control the lift on the front or the rear of the tractor in accordance with a predetermined amount of implement draft.

DETAILED DESCRIPTION OF THE PREFERRED EMBODIMENTS

My invention consists of improvements on the all-electric A.C. tractor disclosed and claimed in the aforesaid allowed copending application which is expressly incorporated herein by reference.

Figure 1B:
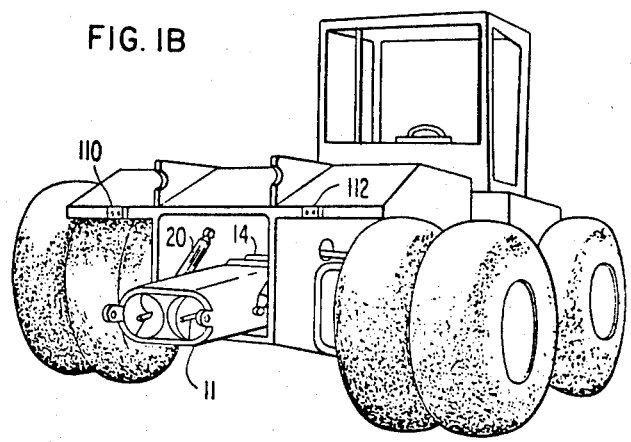
FIG. 1b is a perspective view of the tractor illustrating in more detail the material-transferring tunnel which can also be used to attach and lift implements.
Figure 1A:
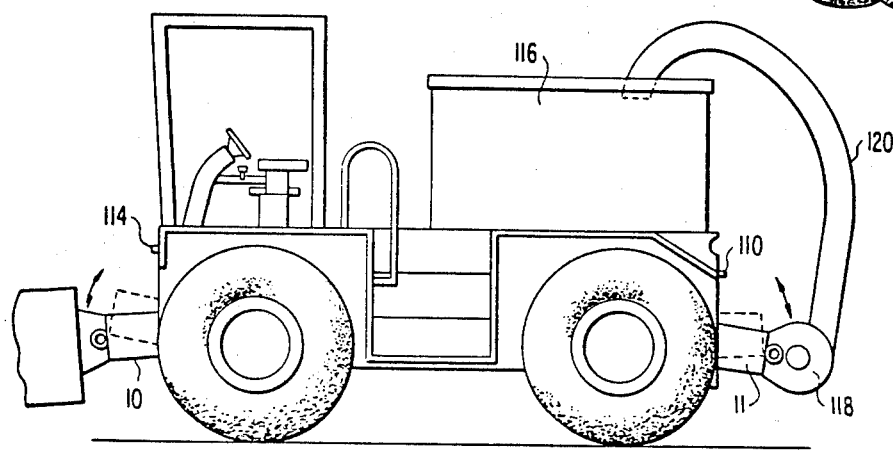
FIG. 1a is a side view of a tractor embodying this invention and shows particularly the vertically adjustable extension of the longitudinal material-transferring tunnel.
Figure 2A:
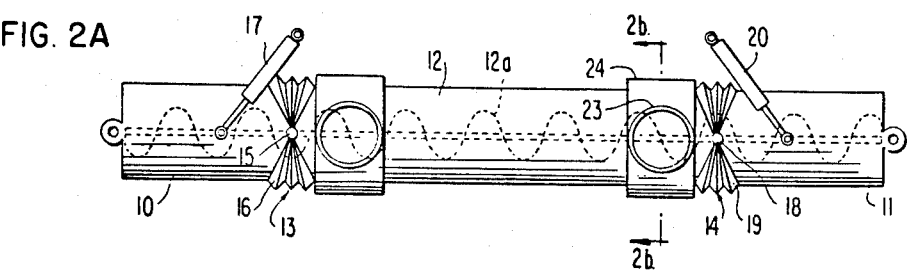
FIG. 2a is a side view of the material-transferring tunnel removed from the tractor to better illustrate the vertically movable extensions.

FIGS. 1a and 1b show a tractor as illustrated in the aforesaid pending application but including the improvement of vertically movable tubes 10 and 11 which form extensions of the material-transferring tunnel 12 (see FIG. 2a) which extends from the front to the rear of the tractor along the longitudinal center line thereof. In this improvement, instead of the material-transferring tunnel being formed by a straight tube as in the aforesaid U.S. Pat. No. 4,113,045, at least one extension tube 10 or 11 is connected to the tunnel 12 by a flexible joint 13 or 14 at at least one end of the tunnel so that the tube can be adjusted vertically relative to the fixed portion of the tunnel. The flexible joint 13, for example, includes a pivot pin 15 on either side of the tunnel and a bellows assembly 16, and lifting cylinders 17 accomplish the vertical adjustment of the tube 10 and replace the lifting arms or forks 70 shown in the aforesaid U.S. Pat. No. 4,113,045. The flexible joint 14 is of similar construction comprising a pivot pin 18 on either side of the tunnel and a bellows assembly 19 with lifting cylinders 20 providing vertical adjustment. Thus, the material-transferring tunnel, and in particular the extension tube 10 or 11, becomes both the lifting and material-transferring means for any modular accessory connected to the tractor. A material-transferring means, such as an auger or screw conveyor 12a with suitable universal joints, transfers the material through the tunnel from the front to the rear of the tractor. Such an arrangement also eliminates the problem of a change in distance or tunnel length between the tractor and accessory. The problem with the adjustable lift arms or forks of said U.S. Pat. No. 4,113,045 was that the arms pivoted at a point different from that at which the accessory joined the tunnel, thereby requiring a telescopic tunnel section between the tractor and the accessory.

Figure 2B:
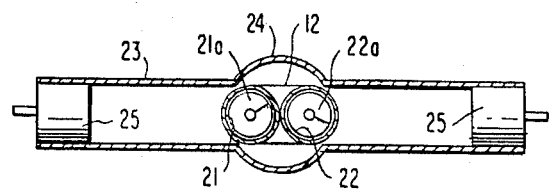
FIG. 2b is a sectional view of FIG. 2a illustrating the tubular axle housing in which a drive wheel motor is mounted and wherein the axle is pivoted about the material-transferring tunnel of the tractor and showing the improved material-transferring tunnel having two compartments.

As particularly shown in the cross-sectional view of FIG. 2b, the tunnel has two individual material-transferring compartments or passageways 21 and 22 so that several types of material, such as grain and chaff, can be transferred simultaneously. The tunnel may have more than two compartments. For example, two smaller compartments may be used for conveying grain, and a larger compartment for conveying chaff. In use, there would be a conveying means associated with the tunnel. Such conveying means can be either mechanical, such as augers or screw conveyors 21a and 22a, or chain and flight or flat belts, or pneumatic means, wherein the material is conveyed by air pressure. The tractor would also be provided with a material-receiving means, such as a container 116, which is carried on the tractor or pulled behind, or both, for example where the crop is stored in one container and the crop residue in another. A blower 118 elevates the material through a discharge spout 120 and blows it into the container 116.

FIG. 2b also illustrates the improved rear axle and wheel motor mounting arrangement. The hollow tube axle 23 has a circular enlargement 24 in the center thereof which surrounds the tractor tunnel 12 and oscillates thereabout. By contrast, in the tractor of the aforesaid U.S. Pat. No. 4,113,045, the rear axle oscillated on a center hinge point directly above the tunnel, thereby occupying a great deal of space where it crossed the tunnel and not permitting the mounting of the traction or wheel motor within the axle. In the improvement shown in FIG. 2b, the axle is tubular or hollow, and the axle is concentric with the center of the tractor wheels. With this improved arrangement, the wheel driving motors 25 are mounted inside the axle 23. Furthermore, with this arrangement, the front and rear axle assemblies are identical, even though only one is permitted to pivot freely. An advantage of this arrangement is that, if either the front or rear axle is left free to pivot with the terrain, the other can be mounted rigidly to the frame, or it can be outfitted with hydraulic cylinders so the tractor can be leveled for hillside operation.

Figure 3:
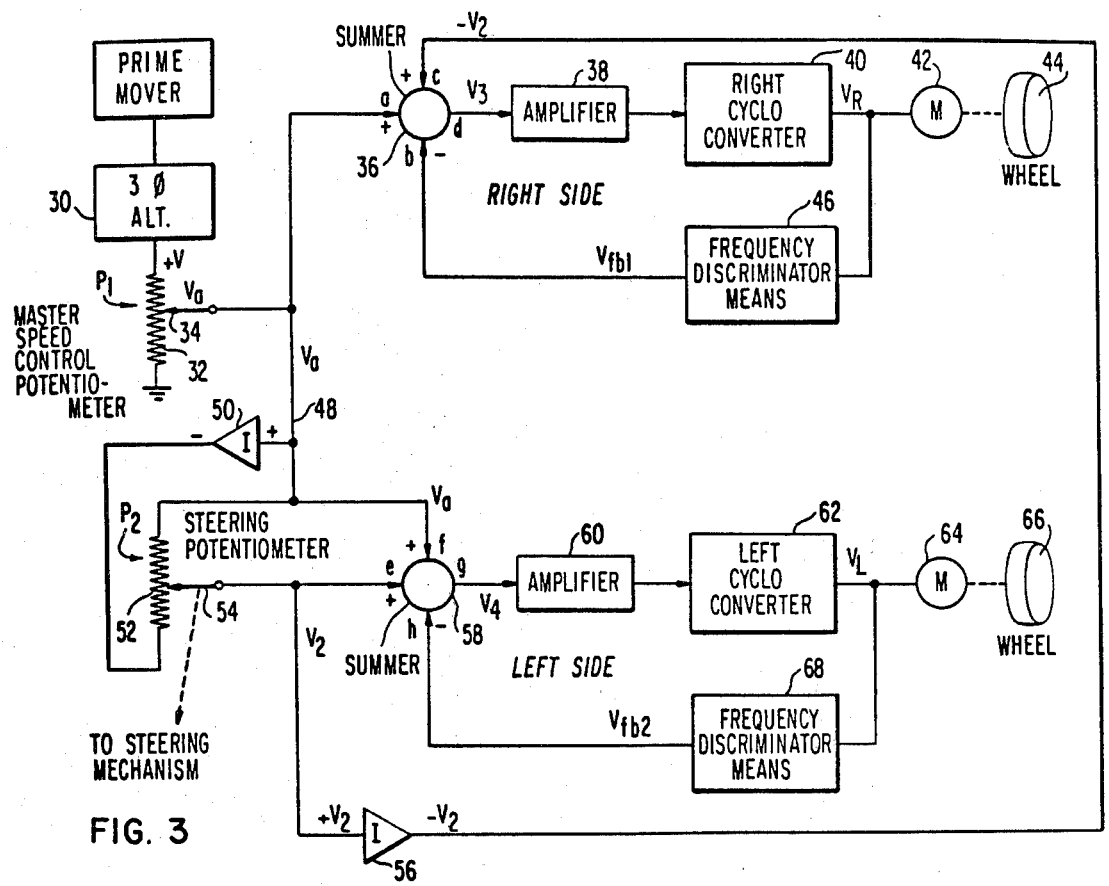
FIG. 3 is a schematic diagram illustrating an embodiment of the differential wheel driving circuit of the invention.

FIG. 3 shows the preferred embodiment of the differential wheel speed control circuit of the invention and represents an improvement on the wheel control circuit shown in FIG. 2 of the aforesaid co-pending application. As shown in said co-pending application, there are mounted on the tractor a prime mover and a three-phase alternator whose A.C. output is applied to left and right cycloconverters which control the right and left wheels, respectively, of the tractor. Even though it is true that the circuit shown in said co-pending application provides a certain amount of differential wheel speed control due to the motor slip of the induction wheel-driving motors, it has been found that because of the great amount of gear reduction necessary for meeting torque requirements, this motor slip is not sufficient to allow short or sharp turns of the tractor.

In the improved differential speed control circuit shown in FIG. 2 of the present application, the speeds of the inboard and outboard wheels on a turn are directly controlled in response to the steering angle, so that the speed of the outside wheels is increased relative to the speed of the inside wheels in a manner analogous to a mechanical differential, with the advantage that the load does not have to be equalized as is required for a differential.

FIG. 3 illustrates a preferred embodiment of the improved differential speed control circuit. The voltage output $+V$ from the alternator 30 on the tractor is applied across a master speed control in the form of a potentiometer P1 having a fixed resistor 32 and a wiper arm 34 whose position on the resistor 32 determines the magnitude of the voltage $V_a$ and, thus, the speed of the tractor wheels when the tractor is moving in a straight line, i.e., when the steering angle is zero. The particular voltage $V_a$ picked off by wiper arm 34 is supplied to the $(+)$ input a of an algebraic summer 36. The summer also has a $(-)$ input b and a $(+)$ input c, together with an output d. The output voltage $V_3$ is amplified by an amplifier 38 and applied to the right cycloconverter 40 whose output voltage $V_R$ is applied to the induction motor 42 which is mechanically coupled to a right wheel 44. The frequency of the output voltage $V_R$ of the cycloconverter determines the rotational speed of motor 42 and wheel 44. The output voltage $V_R$ is also supplied to a frequency discriminator 46 whose output voltage $V_{fb1}$ is proportional to the frequency of $V_R$, and the voltage $V_{fb1}$ is applied to the $(-)$ input b of summer 36.

The output voltage $V_a$ of the master speed control potentiometer P1 is also applied to the upper end of the fixed resistor 52 of a steering potentiometer P2. The voltage $V_a$ is also inverted by an inverter 50 and applied to the lower end of resistor 52. The wiper arm 54 of the steering potentiometer P2 is positioned along the fixed resistor 52 in accordance with the steering angle of the tractor. When the steering angle is zero, the wiper arm 54 is on the midpoint of resistor 52, and thus, the voltage $V_2$ is zero. Also, $V_2$ is positive when wiper arm 54 is above the midpoint, and negative when the wiper arm is below the midpoint. The voltage $V_2$ is fed back through an inverter 56 as a voltage $-V_2$ to the $(+)$ input c of the summer 36 in the right wheel control circuit. Consequently, the voltage $V_3$ on the output of the summer 36 is equal to $V_3 = V_a - V_{fb1} + (-V_2)$.

The voltage $V_2$ on the wiper arm 54 is also applied to the (+) input e of another summer 58. The voltage $V_a$ is applied to the (+) input f of the summer 58. The voltage $V_4$ on the output g of summer 58 is amplified by an amplifier 60 and applied to the input of the left cycloconverter 62 whose output voltage $V_L$ is applied to the left wheel induction motor 64 which is mechanically coupled to a left wheel 66 of the tractor. The frequency of the voltage $V_L$ determines the rotational speed of both the motor 64 and the wheel 66. The cycloconverter output voltage $V_L$ is also applied to a frequency discriminator 68 which produces a feedback voltage $V_{fb2}$ to the (−) input h of summer 58. The feedback voltage $V_{fb2}$ is proportional to the frequency of the left wheel motor control voltage $V_L$. Thus, $V_4 = V_a - V_{fb2} + V_2$.

Since the wiper arm 54 is positioned in accordance with the steering angle of the tractor, the input voltage $V_3$ to cycloconverter 40 will increase when the input voltage $V_4$ to cycloconverter 62 decreases, and vice versa, to provide an electronic differential speed control for the right and left wheels. More specifically, if the tractor is moving along a straight line, i.e., the steering angle is zero, then the master speed control voltage $V_a$ is applied to both cycloconverters 40 and 62, since the voltage $V_2$ is zero. Consequently, the wheel driving motor voltages $V_R$ and $V_L$ for the right and left wheels, respectively, are of the same frequency, and both the right and left wheels will be rotated at the same speed. However, when the tractor is making a left hand turn, since it is desired to drive the right or outside wheels at a greater speed than the left or inside wheels, the wiper arm 54 will move downward so that voltage $V_2$ assumes a negative value dependent upon the steering angle. Thus, the magnitude of voltage $V_2$ will be added to the speed control voltage $V_a$ in summer 36, and subtracted from $V_a$ in summer 58, whereby the voltage $V_3$ is larger than the voltage $V_4$. Thus, the frequency of voltage $V_R$ is greater than that of voltage $V_L$, and the right wheel motor 42 rotates faster than the left wheel motor 64.

In a wheel tractor the wiper arm 54 of the potentiometer P2 is controlled by the steering action of the tractor. Specifically, in a non-articulated tractor the wiper arm 54 is mechanically controlled by the movement of the tie rod or directly from the steering shaft. In an articulated tractor, the angle of steering is determined at the point where the front and back halves of the tractor are connected, and the potentiometer P2 is typically mounted on one tractor half, with the wiper arm 54 mechanically connected to the other tractor half.

A crawler tractor, as opposed to wheel tractor, is controlled in a similar manner, with the exception that a crawler tractor is actually steered by the speeding up and slowing down of the tracks on the opposite sides of the tractor. In a crawler tractor, the steering action is controlled by the relative speeds of a right and left traction motor. As the manual steering control is operated, it will produce a turn in accordance with the distance the steering control is moved from its neutral or straight ahead position. The greater the distance the steering control is moved in one direction, the slower the track on one side will move and the faster the track on the other side will move. Thus, the wiper 54 is simply mechanically connected to the steering control.

Figure 4:
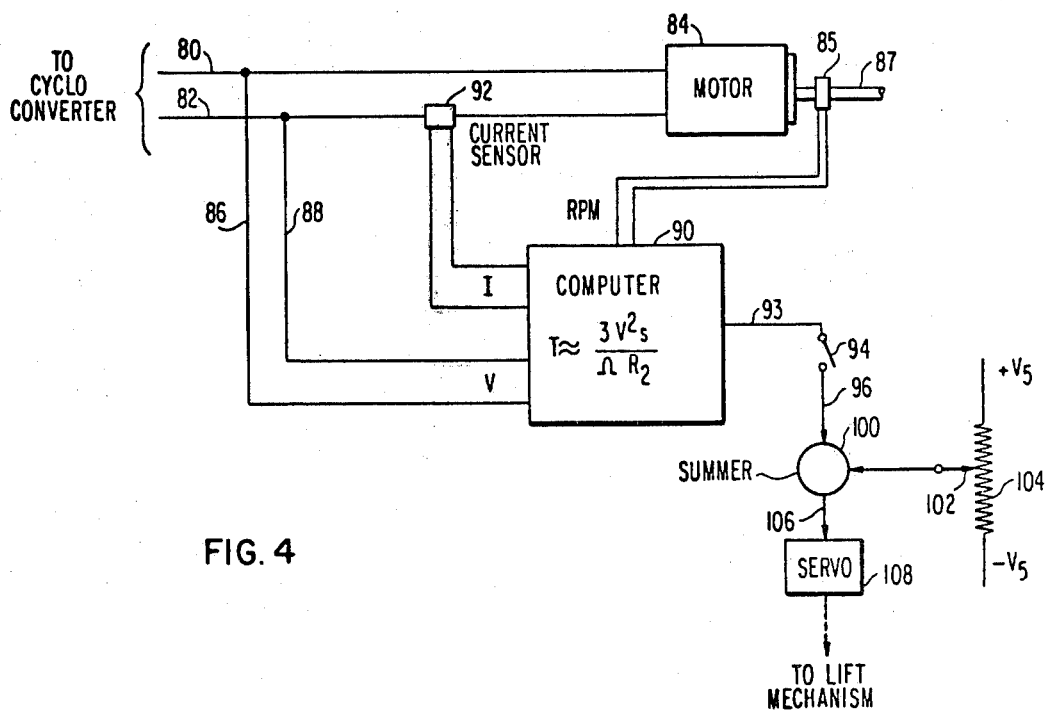
FIG. 4 is a schematic diagram of an individual drive wheel torque monitoring circuit embodying the invention.

FIG. 4 illustrates the improved torque demand monitoring and control circuit which is coupled to the two input leads of a wheel-driving induction motor.

Input leads 80 and 82 supply the frequency varying A.C. voltage from the cycloconverter to an induction wheel-driving motor 84. The input or applied voltage V to the motor is applied via leads 86 and 88 to a conventional motor torque computer 90. The current I flowing to the motor 84 is sensed by means of a current sensor 92 coupled to one of the motor input leads, such as lead 82. The current sensor produces a voltage proportional to the current, and this voltage is also applied to the computer 90. The current sensor may be a current transformer or any other suitable current-to-voltage transducer. A tachometer 85 is driven by the output shaft 87 of motor 84 and supplies to the computer a voltage proportional to the rotational speed (rpm) of the motor. The computer computes from these voltage, current and rpm signals an output signal on line 93, which signal is indicative of the motor torque. The computer may compute the torque T in accordance with the following formula found on page 673 of *Circuits, Devices and Systems*, by Ralph J. Smith, John Wiley Publishers, 3rd edition:

$$T = 3V^2 s / \Omega R_2$$

where

V is the applied voltage,
s is the slip,
$\Omega$ is the synchronous speed, and
$R_2$ is the rotor resistance.

This output signal is applied through a switch 94 to one input 96 of a summer 100. The other input of the summer is the voltage appearing on the manually adjustable wiper arm 102 of a potentiometer resistor 104. The output of the summer on line 106 is then proportional to the motor torque as modified by the voltage on the wiper arm 102. This output voltage of the summer is applied to a suitable servo mechanism 108 which then changes the position of the lift mechanism of an implement attached to the tractor.

The purpose of the circuit of FIG. 4 is to determine the torque on the drive wheel and then in turn control the lift of the front or rear of the tractor in accordance with a predetermined amount of implement draft. In conventional tractors, this result is generally achieved in two ways. The first way is to sense the amount of draft or pull on the lift arms themselves and then raise or lower the lift arms to keep the implement draft constant regardless of soil condition. The other way is to place a torque sensitive device in the drive line between the engine and drive wheels, which device in turn raises or lowers the implement through hydraulic lift arms to maintain constant draft regardless of terrain or soil conditions.

It is clear that the electric torque monitoring control circuit shown in FIG. 4 is much simpler and more responsive than these corresponding prior art mechanical systems because the improved circuit immediately senses changes in the motor current and voltage as soon as the torque requirements of the motor change. This voltage and current change is monitored and used to control the raising or lowering of the lift arms to maintain a predetermined amount of implement draft or load on the drive wheels of the tractor. Such a result is quite an advantage, because it helps control wheel spin when plowing, discing or doing other types of tillage work.

The computer 90 operates on the parameters of the applied A.C. voltage and current, frequency and rpm to calculate the motor torque. The frequency parameter is obtained from the measured voltage and/or current, and slip is a function of frequency and rpm. The synchronous speed for a particular motor is a function of the motor design and frequency of the applied voltage. In practice, this computer may be a microcomputer or a suitable analog computing circuit.

The potentiometer wiper arm 102 is manually positioned by the tractor operator to adjust the voltage applied to servo 108 to a value depending upon operating conditions actually encountered in the field. The servo controls the hydraulic or electric lift arms on the tractor in accordance with the draft demand of the implement in a manner similar to prior mechanical systems mentioned above.

In the aforesaid copending application, there was described the use of the three-phase electrical power for driving auxiliary equipment or accessories which are themselves driven by three-phase induction motors. However, the availability of this mobile, variable frequency three-phase power source makes it practicable to drive other non-motor driven accessories. For example, the three-phase power can be used to energize the electric grid of a crop dryer for drying grain at the same time the grain is being combined. The power can also be used for the direct electrocution of weeds, or to drive a microwave weed-killing device. Electrical power can also be used to energize a laser for harvesting crops, thereby eliminating the need of using sickles for cutting the crop from the ground. Depending upon the nature of the electrically powered device, the power can be derived directly from the output of the three-phase alternator, from the variable frequency output of a cycloconverter, or D.C. power is obtainable by rectification of the A.C. power. A pair of suitable power outlets or connectors 110 and 112 may be mounted on the rear of the tractor as shown in FIG. 1b; another pair may be mounted on the front, and one of this pair is designated by the reference numeral 114 in FIG. 1a.

I claim:

1. A land vehicle having left and right traction means, and comprising a material-transferring tunnel extending from the front to the rear of the vehicle and passing between the two traction means, said tunnel being closed along its length and open at the front and rear ends thereof, and a vertically adjustable tunnel extension hinged at one end of said tunnel, and wherein said left traction means comprises a pair of front and rear left wheels, and said right traction means comprises a pair of front and rear right wheels, and further comprising:
    at least one hollow-tubular axle having an enlarged portion in the center thereof for mounting said axle for oscillating movement about said tunnel; and
    left and right wheel-driving induction motors mounted within said axle at opposite ends thereof.

* * * * *